United States Patent
Miao et al.

(10) Patent No.: US 10,586,167 B2
(45) Date of Patent: Mar. 10, 2020

(54) REGULARIZED MODEL ADAPTATION FOR IN-SESSION RECOMMENDATIONS

(71) Applicant: LinkedIn Corporation, Mountain View, CA (US)

(72) Inventors: Xu Miao, Sunnyvale, CA (US); Yitong Zhou, Sunnyvale, CA (US); Joel D. Young, Milpitas, CA (US); Lijun Tang, San Jose, CA (US); Anmol Bhasin, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 692 days.

(21) Appl. No.: 14/864,499

(22) Filed: Sep. 24, 2015

(65) Prior Publication Data

US 2017/0091652 A1    Mar. 30, 2017

(51) Int. Cl.
| | |
|---|---|
| *G06N 20/00* | (2019.01) |
| *G06Q 10/00* | (2012.01) |
| *G06Q 30/02* | (2012.01) |
| *G06Q 10/06* | (2012.01) |
| *G06N 20/20* | (2019.01) |

(52) U.S. Cl.
CPC ............. *G06N 20/00* (2019.01); *G06N 20/20* (2019.01); *G06Q 10/00* (2013.01); *G06Q 10/06* (2013.01); *G06Q 30/0282* (2013.01)

(58) Field of Classification Search
CPC .... G06Q 30/0631; G06Q 10/00; G06Q 10/06; G06Q 30/0282; G06N 99/005; G06F 9/46
See application file for complete search history.

(56) References Cited

U.S. PATENT DOCUMENTS

| | | | |
|---|---|---|---|
| 6,321,221 B1 | 11/2001 | Bieganski | |
| 7,734,680 B1 * | 6/2010 | Kurapati | G06F 17/30035 709/203 |
| 8,996,530 B2 * | 3/2015 | LuVogt | G06F 17/30867 707/740 |

(Continued)

OTHER PUBLICATIONS

Kevin McCarthy, Maria Salamo, Lorcan Coyle, Lorraine McGinty, Barry Smyth & Paddy Nixon, "CATS: A Synchronous Approach to Collaborative Group Recommendation", 2006, American Association for Artificial Intelligence, p. 86-91. (Year: 2006).*

(Continued)

*Primary Examiner* — Kamran Afshar
*Assistant Examiner* — Ying Yu Chen
(74) *Attorney, Agent, or Firm* — Park, Vaughan, Fleming & Dowler LLP; Chia-Hsin Suen

(57) ABSTRACT

The disclosed embodiments provide a method and system for performing regularized model adaptation for in-session recommendations. During operation, the system obtains, from a server, a first global version of a statistical model. During a first user session with a user, the system improves a performance of the statistical model by using the first global version to output one or more recommendations to the user and using the first global version and user feedback from the user to create a first personalized version of the statistical model. At an end of the first user session, the system transmits an update containing a difference between the first personalized version and the first global version to the server for use in producing a second global version of the statistical model by the server.

20 Claims, 7 Drawing Sheets

(56) References Cited

U.S. PATENT DOCUMENTS

| | | | |
|---|---|---|---|
| 9,900,358 B1* | 2/2018 | Tomkins | H04L 65/60 |
| 2004/0254957 A1 | 12/2004 | Hyotyniemi et al. | |
| 2006/0282304 A1 | 12/2006 | Bedard et al. | |
| 2007/0043817 A1 | 2/2007 | Oliver et al. | |
| 2009/0228846 A1 | 9/2009 | McConaghy et al. | |
| 2014/0255882 A1 | 9/2014 | Hadad et al. | |
| 2014/0280251 A1* | 9/2014 | Somekh | G06F 17/30867 |
| | | | 707/754 |
| 2015/0058320 A1* | 2/2015 | Zheng | G06F 17/30864 |
| | | | 707/722 |
| 2015/0242760 A1 | 8/2015 | Miao et al. | |

OTHER PUBLICATIONS

Mikhail Bilenko and Matthew Richardson, "Predictive Client-side Profiles for Personalized Advertising", 2011, KDD'11, pp. 413-421 . (Year: 2011).*

Xu Miao, Chun-Te Chu, Lijun Tang, Yitong Zhou, Joel Young, and Anmol Bhasin, "Distributed Personalization", Aug. 10, 2015, KDD'15, pp. 1989-1998. (Year: 2015).*

"Non Final Office Action Issued in U.S. Appl. No. 14/864,474", dated Nov. 2, 2018, 20 Pages.

"European Search Report Issued in European Patent Application No. 15905003.8", dated Apr. 17, 2019, 12 Pages.

Li, et al., "Parameter Server for Distributed Machine Learning", In Proceedings of the 2014 International Conference on Big Data Science and Computing, Dec. 9, 2013, 10 Pages.

Tsai, et al., "A Learning Objects Recommendation Model based on the Preference and Ontological Approaches", In Sixth IEEE International Conference on Advanced Learning Technologies (ICALT'06), Jul. 5, 2006, 5 Pages.

* cited by examiner

US 10,586,167 B2

REGULARIZED MODEL ADAPTATION FOR IN-SESSION RECOMMENDATIONS

RELATED APPLICATION

The subject matter of this application is related to the subject matter in a co-pending non-provisional application by the same inventors as the instant application and filed on the same day as the instant application, entitled "Version Control for Asynchronous Distributed Machine Learning," having Ser. No. 14/864,474, and filing date 24 Sep. 2015.

BACKGROUND

Field

The disclosed embodiments relate to in-session recommendations. More specifically, the disclosed embodiments relate to techniques for performing regularized model adaptation for in-session recommendations.

Related Art

Analytics may be used to discover trends, patterns, relationships, and/or other attributes related to large sets of complex, interconnected, and/or multidimensional data. In turn, the discovered information may be used to gain insights and/or guide decisions and/or actions related to the data. For example, business analytics may be used to assess past performance, guide business planning, and/or identify actions that may improve future performance.

However, significant increases in the size of data sets have resulted in difficulties associated with collecting, storing, managing, transferring, sharing, analyzing, and/or visualizing the data in a timely manner. For example, conventional software tools and/or storage mechanisms may be unable to handle petabytes or exabytes of loosely structured data that is generated on a daily and/or continuous basis from multiple, heterogeneous sources. Instead, management and processing of "big data" may require massively parallel software running on a large number of physical servers and/or nodes, as well as synchronization among the servers and/or nodes.

Consequently, big data analytics may be facilitated by mechanisms for efficiently and/or effectively collecting, storing, managing, compressing, transferring, sharing, analyzing, and/or visualizing large data sets.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
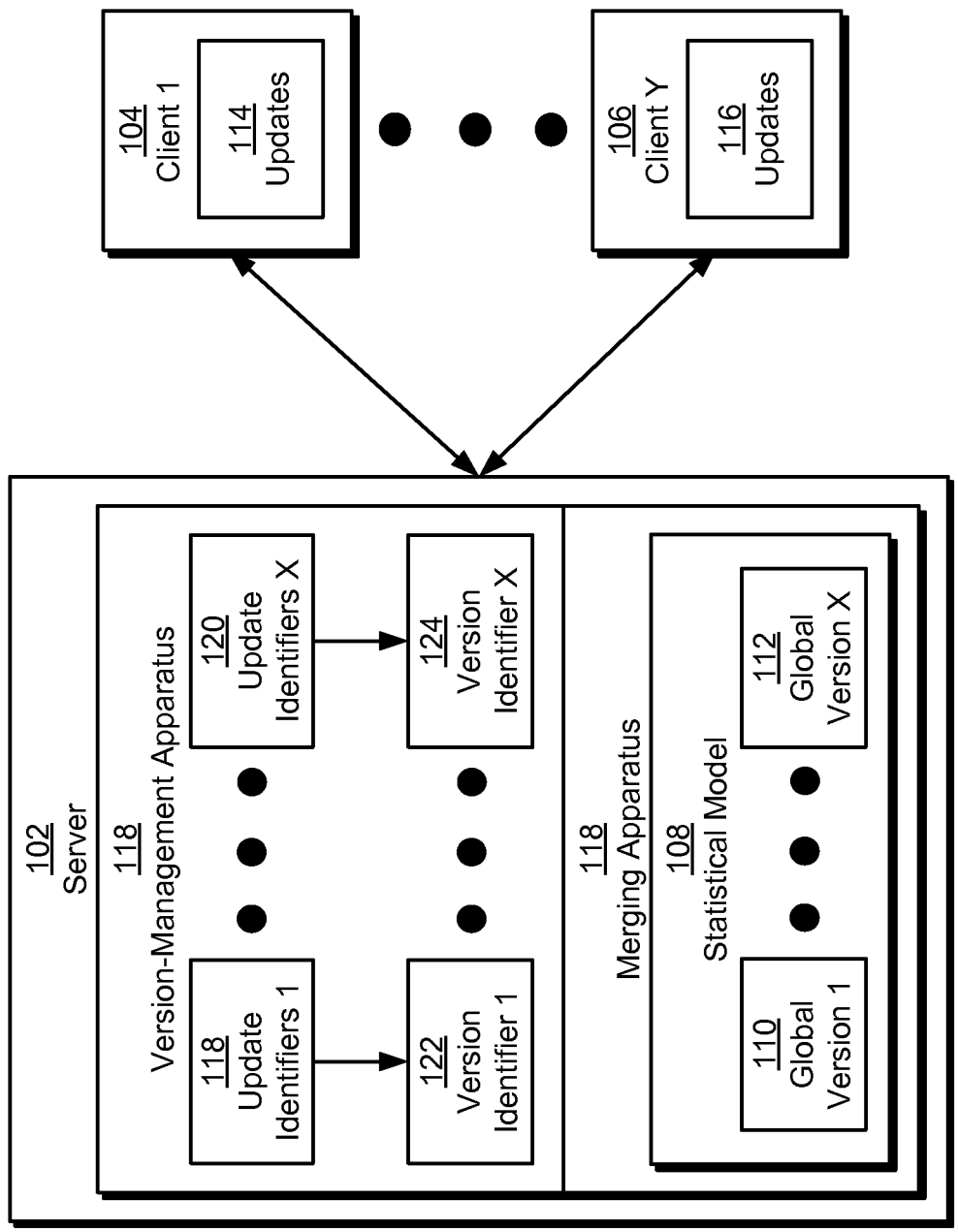
FIG. 1 shows a schematic of a system in accordance with the disclosed embodiments.

The disclosed embodiments provide a method, apparatus, and system for processing data. More specifically, the disclosed embodiments provide a method, apparatus, and system for performing asynchronous distributed machine learning. As shown in FIG. 1, a system for performing the asynchronous distributed machine learning may include a server 102 and a number of clients (e.g., client 1 104, client y 106), which interact with one another to produce multiple versions of a statistical model 108. Each of these components is described in further detail below.

Statistical model 108 may be used to perform statistical inference, estimation, classification, clustering, personalization, recommendation, optimization, hypothesis testing, and/or other types of data analysis. For example, statistical model 108 may be a regression model, artificial neural network, support vector machine, decision tree, naïve Bayes classifier, Bayesian network, hierarchical model, and/or ensemble model. The results of such analysis may be used to discover relationships, patterns, and/or trends in the data; gain insights from the input data; and/or guide decisions or actions related to the data. For example, statistical model 108 may be used to analyze input data related to users, organizations, applications, websites, content, and/or other categories. Statistical model 108 may then be used to output scores, provide recommendations, make predictions, manage relationships, and/or personalize user experiences based on the data.

In addition, statistical model 108 may be trained and/or adapted to new data received on the clients. For example, the clients may be electronic devices (e.g., personal computers, laptop computers, mobile phones, tablet computers, portable media players, digital cameras, etc.) that produce updates 114-116 to statistical model 108 based on user feedback from users of the clients. Alternatively, the clients may generate updates 114-116 to statistical model 108 in a distributed fashion on different subsets of training data from server 102 and/or another centralized data source.

Each update may represent a local version of statistical model 108 that is adapted to input data on the corresponding client. In addition, the clients may produce updates 114-116 from global versions (e.g., global version 1 110, global version x 112) of statistical model 108. For example, a client may periodically receive a latest global version of statistical model 108 from server 102. The client may then generate an update to the global version by providing user feedback and/or other input data as training data to the global version.

In turn, the clients may transmit updates 114-116 to server 102, and server 102 may merge updates 114-116 into subsequent global versions of statistical model 108. After a new global version of statistical model 108 is created, server 102 may transmit the new global version to the clients to propagate updates 114-116 included in the new global version to the clients. The clients may then produce additional updates from the new global version and provide the additional updates to server 102 for subsequent generation of additional global versions of statistical model 108.

Thus, statistical model 108 may be iteratively trained through the bidirectional transmission of data from server 102 to the clients and from the clients to server 102. Moreover, alternating the creation of global versions of statistical model 108 from input data aggregated from multiple clients with the updating of the global versions on the clients may prevent overfitting of statistical model 108 to input data on individual clients.

In one or more embodiments, local versions of statistical model 108 are produced on the clients to personalize statistical model 108 to users of the clients. More specifically, the clients may obtain a global version of statistical model 108 from server 102. Each client may then update the global version in real-time based on user input or feedback from a user of the client. As a result, the local version of statistical model 108 on the client may be adapted to the user's behavior or preferences as the user interacts with statistical model 108. For example, the client may track the user's searches, clicks, views, text input, conversions, and/or other feedback during a user session with a job search tool. As each piece of feedback is received from the user, the client may provide the feedback as training data for statistical model 108 to customize the output of statistical model 108 to the user's current job search activity. Consequently, the client may generate recommendations of job listings based on aggregated training data used to produce the global version, as well as the user's input during the current session with the job search tool. Adapting statistical models to in-session user behavior is described in further detail below with respect to FIG. 3.

In one or more embodiments, server 102 and the clients perform asynchronous distributed machine learning, in which barriers or locks for synchronizing the updating of statistical model 108 are fully removed. For example, server 102 may update statistical model 108 by producing global versions of statistical model 108 and transmitting the global versions to the clients independently from receiving updates 114-116 to the global versions from the clients. Since updates to the global versions are not affected by variations in the processing speed, computational power, and/or network delay of individual clients, statistical model 108 may be updated faster than distributed machine learning techniques that include barriers or locks for synchronizing statistical model updates.

More specifically, the system of FIG. 1 may use automatic version control to perform asynchronous distributed machine learning. As shown in FIG. 1, a version-management apparatus 118 in server 102 may track global versions (e.g., global version 1 110, global version x 112) of statistical model 108 using a set of version identifiers (e.g., version identifier 1 122, version identifier x 124). Each version identifier may represent a given global version of statistical model 108, which is created by a merging apparatus 118 that merges a subset of updates 114-116 from the clients into one or more previous global versions of statistical model 108.

To track the subset of updates that have been merged into each global version, the corresponding version identifier may be generated from a set of update identifiers (e.g., update identifiers 1 118, update identifiers x 120) for the subset of updates. For example, each update identifier may specify the client from which the corresponding update was received, as well as the global version of statistical model 108 used to produce the update. Version-management apparatus 118 may concatenate, hash, and/or otherwise combine update identifiers for a given subset of updates 114-116 into the version identifier for the global version that will be produced from the updates. In turn, merging apparatus 118 may use the version identifiers to ensure that all updates 114-116 from the clients have been merged into the global versions of statistical model 108 while avoiding merging of each update more than once into the global versions. Thus, by tracking updates 114-116 to statistical model 108 in version identifiers for the global versions, version-management apparatus 118 may allow the global versions to be generated without synchronization barriers associated with updates 114-116.

The asynchronous distributed machine learning performed by the system of FIG. 1 may be defined as an optimization problem using the following equations:

$$\min_{z, \{w_1 \ldots w_M\}} \frac{1}{2}\|z\|^2 + \sum_{i=1}^{M} \left( f_i(w_i) + \frac{\gamma}{2}\|w_i - z\|_2^2 \right) \quad (1)$$

$$f_i(w_i) = \sum_{j=1}^{N_i} l(x_{ij}, y_{ij}; w_i) \quad (2)$$

In particular, Equation 1 may represent a general formalization of the optimization problem, where $w_i$ is a local version of statistical model 108 on a client (e.g., client 1 104, client y 106), the clients are indexed from 1 to M, and z is a global version of statistical model 108. Equation 2 represents a use of statistical model 108 in a classification task, where l is a convex loss function, $x_{ij}$ is an input feature vector, and $y_{ij}$ is the target to predict.

Equation 1 may be solved using a synchronous alternating direction method of multipliers (ADMM) technique. More specifically, local consensus variables $q_i$ may be added to Equation 1 to obtain the following:

$$\min_{z,q,\{w_i\}} \sum_{i=1}^{M} f_i(w_i) + \frac{\gamma}{2}\|w_i - q_i\|^2 + \frac{1}{2}\|z\|^2 \quad (3)$$

$$\text{subject to } q_i = z, \forall\, i \in [1 \ldots M]$$

Equation 3 may also be converted into an augmented Lagrangian to obtain the following:

$$\mathcal{L}(z, \{q_i, w_i, \lambda_i\}) = \quad (4)$$

$$\sum_{i=1}^{M} f_i(w_i) + \frac{\gamma}{2}\|w_i - q_i\|^2 + \frac{\rho}{2}\|q_i - z\|^2 + \lambda_i^T(q_i - z) + \frac{1}{2}\|z\|^2$$

In Equation 4, $\lambda$ represents an estimate of the Lagrange multiplier.

A synchronous ADMM solution may then be obtained using the following:

$$w_i^{t+1}, q_i^{t+1} \operatorname*{argmin}_{q_i, w_i} f_i(w_i) + \frac{\gamma}{2}\|w_i - q_i\|^2 + \frac{\rho}{2}\|q_i - z^t\|^2 + \lambda_i^t(q_i - z^t) \quad (5)$$

$$z^{t+1} = \operatorname*{argmin}_{z} \frac{\rho}{2}\|q_i^{t+1} - z^t\|^2 + \lambda_i^t(q_i^{t+1} - z^t) + \frac{1}{2}\|z\|^2 \quad (6)$$

$$\lambda_i^{t+1} = \lambda_i^t + \rho(q_i^{t+1} - z^{t+1}) \quad (7)$$

Equations 5, 6 and 7 may then be used to obtain the following updating rules, where $\mu = \lambda/\rho$:

$$\forall\, i, \mu_i^{t+1} = \mu_i^t + q_i^t - z^t \quad (8)$$

$$\forall\, i, w_i^{t+1} = \operatorname*{argmin}_{w} f_i(w) + \frac{\rho\gamma}{2(\rho+\gamma)}\|w - z^t + \mu_i^{t+1}\|^2 \quad (9)$$

$$\forall\, i, q_i^{t+1} = \frac{\rho}{\rho+\gamma}z^t + \frac{\gamma}{\rho+\gamma}w_i^{t+1} - \frac{\rho}{\rho+\gamma}\mu_i^{t+1} \quad (10)$$

$$z^{t+1} = \frac{\sum_{i=1}^{M}(q_i^{t+1} + \mu_i^{t+1})}{M + \frac{1}{\rho}} \quad (11)$$

In synchronous ADMM, Equations 8, 9 and 10 are performed in the clients, while Equation 11 is performed by server 102. Server 102 may wait for each round of updates 114-116 to be submitted by the clients before merging updates 114-116 into a new global version of statistical model 108. Thus, the rate at which server 102 generates global versions of statistical model 108 may be limited by the updating of statistical model 108 on the slowest client.

An asynchronous ADMM may omit the synchronization barrier, thus allowing server 102 to generate global versions of statistical model 108 independently from the transmission of updates 114-116 to statistical model 108 from the clients. In asynchronous ADMM, server 102 may use the following updating rules to create new global versions of statistical model 108:

$$\tilde{z}_{h(j)}^{t+1} = \tilde{z}_{h(j)}^{t} + \frac{1}{M + \frac{1}{\rho}}(q_j^t + \mu_j^t - q_j^{t-1} - \mu_j^{t-1}) \quad (12)$$

$$\tilde{z}_k^{t+1} = \frac{1}{|B_k|} \sum_{j \in B_k} \tilde{z}_{h(j)}^{t+1} \quad (13)$$

In the updating rules above, $\tilde{z}_{h(j)}$ represents a global version of statistical model 108, where $h(j) \in [1 \ldots k-1]$ is the mapping from a client j to a version identifier of a given global version from which an update on the client is produced, and $B_k$ is the set of clients submitting updates (e.g., updates 114-116) for merging into statistical model 108 at time k.

During asynchronous ADMM, server 102 may track the merging of updates 114-116 into statistical model 108 using version identifiers (e.g., version identifier 1 122, version identifier x 124) of global versions of statistical model 108. For example, server 102 may iteratively generate new global versions of statistical model 108 using the following, where K is the version number (e.g., version identifier) of the latest global version of statistical model 108 and $\Delta_j$ is an update (e.g., updates 114-116) to statistical model 108 from the jth client:

--- input: $\{\Delta j, h(j) \mid j \in B\}$
for $j \in B$ do $\quad z_{h(j)} = z_{h(j)} + \dfrac{\Delta_j}{M + \dfrac{1}{\rho}};$ end
K = K + 1;

$z_K = \dfrac{1}{B}\Sigma_{j \in B} z_{h(j)};$

Broadcast $(z_K, K)$;

---

The above steps may be performed without iteration locks so the global version is generated independently of updates 114-116 to statistical model 108 from the clients. Once the global version is generated, the global version may be broadcast to the clients.

In turn, each client may generate updates 114-116 to statistical model 108 using the following, where $z_K$ is the latest global version of statistical model 108:

input: x, y, i
Add x, y to samples for client i;
Update $\mu_i$, $q_i$, $w_i$ according to Equations 8, 9, and 10;
Let $\mu_i^0$ and $Q_i^0$ be the original values;
$\Delta_i = \mu_i^0 + q_i^0$;
Reduce $(\Delta_i, k)$ More specifically, client i may perform a local optimization by updating intermediate variables $\mu_i$ and $q_i$ and the local version of statistical model 108 $w_i$ based on input data received at the client and/or the output of the local version based on the input data. Next, the client may calculate the difference between the updated variables and the previous versions of the variables. The client may then use a reduce step in a distributed-processing technique such as Message Passing Interface (MPI) to produce an update (e.g., updates 114-116) to statistical model 108 using the difference and the current global version of statistical model 108 from which the local version was produced.

The equations described above further include a number of parameters, which may be used to control and/or modify the behavior of server 102 and/or the clients. First, an optimization parameter ρ may be used to adjust the rate of convergence of global versions of statistical model 108, with a higher value for ρ resulting in a faster rate of convergence to a less optimal result. Thus, ρ may be selected to balance the convergence rate and the performance of statistical model 108.

Second, a regularization parameter γ may control the amount of personalization of each local version of statistical model 108. When γ is 0, the local version is fully personalized to the user of the corresponding client and does not include any adaptation to the behavior of other users. In other words, a value of 0 for γ may result in the creation of a local version of statistical model 108 that is completely separate from any global versions of statistical model 108. As γ increases, the personalization of the local version and convergence of statistical model 108 decrease, subject to an upper bound of ρ/2.

The regularization parameter γ may be adjusted to balance the generalization of statistical model 108 with the personalization of statistical model 108. For example, γ may initially be set to a large value to prevent overfitting of statistical model 108 to limited available data for a user. As additional data is collected from the user (e.g., during one or more user sessions), γ may be decreased to adapt a local version of statistical model 108 more to the behavior of the user on the corresponding client. If the behavior of the user also diverges from those of other users (e.g., based on aggregated input from the other users used to create global versions of statistical model 108), γ may continue to be decreased until γ reaches 0. In another example, different values of γ may be used with different sessions and/or other intervals of interaction with each user, and the value of γ with the best performance may be selected for the user.

While the asynchronous distributed machine learning technique has been described with respect to the Equations above, those skilled in the art will appreciate that the system of FIG. 1 may be used to process other types of problems. For example, the system of FIG. 1 may be applied to any type of convex optimization problem, including problems related to personalization and/or recommendation.

By performing asynchronous distributed machine learning, the system of FIG. 1 may improve training of statistical model 108 over conventional model adaptation techniques that require synchronization barriers, use only global versions of statistical models on all clients, or use only personalized versions of a statistical model on each client. At the same time, the optimization and regularization parameters may be used to adjust the convergence, performance, and/or personalization of statistical model 108 in a distributed environment with large numbers of users and/or multiple sets of training data. Consequently, the system of FIG. 1 may provide large-scale personalization and/or recommendation via asynchronous distributed machine learning.

Those skilled in the art will appreciate that the system of FIG. 1 may be implemented in a variety of ways. First, the clients may execute on and/or include different types of software or hardware components. For example, the clients may include web applications, native applications, mobile applications, operating systems, device drivers, and/or other types of software. Similarly, the clients may execute on personal computers, laptop computers, workstations, portable electronic devices, and/or other types of network-enabled computing devices.

Second, one or more instances of server 102 may be used to aggregate updates 114-116 from the clients into global versions of statistical model 108. If multiple instances of server 102 exist, each instance may be matched to a different subset of clients based on attributes of the instance and the clients. For example, the network bandwidth, processor resources, and/or memory on a given instance of server 102 may be matched to a client based on the rate at which the client generates updates to statistical model 108, the importance of the client, the revenue associated with the client, and/or other metrics or characteristics associated with the client. Different global versions of statistical model 108 produced by the instances may then be merged into a master global version through additional communication among the server 102 instances.

Third, server 102 may use different version-control techniques to track the generation of global versions of statistical model 108 from updates 114-116 received from the clients. For example, server 102 may hash update identifiers for updates to be merged into a global version of statistical model 108 into a version identifier for the global version. In another example, server 102 may generate version numbers for global versions of statistical model 108 based on the number of updates merged into each global version, the types of clients from which the updates were received, the time interval between global versions, and/or other attributes associated with the global versions and/or updates 114-116.

Fourth, server 102 may use a number of techniques to aggregate updates 114-116 into the global versions. As illustrated in the above equations, server 102 may merge a set of updates into a global version of statistical model 108 by averaging the contribution of each update. Alternatively, server 102 may merge the updates into the global version according to the level of activity in each client, the recency of the updates, the importance of the client, revenue associated with the client, and/or other attributes of the client. Server 102 may further transmit portions of global versions of statistical model 108 to some or all of the clients to reduce network traffic between server 102 and the clients.

Figure 2:
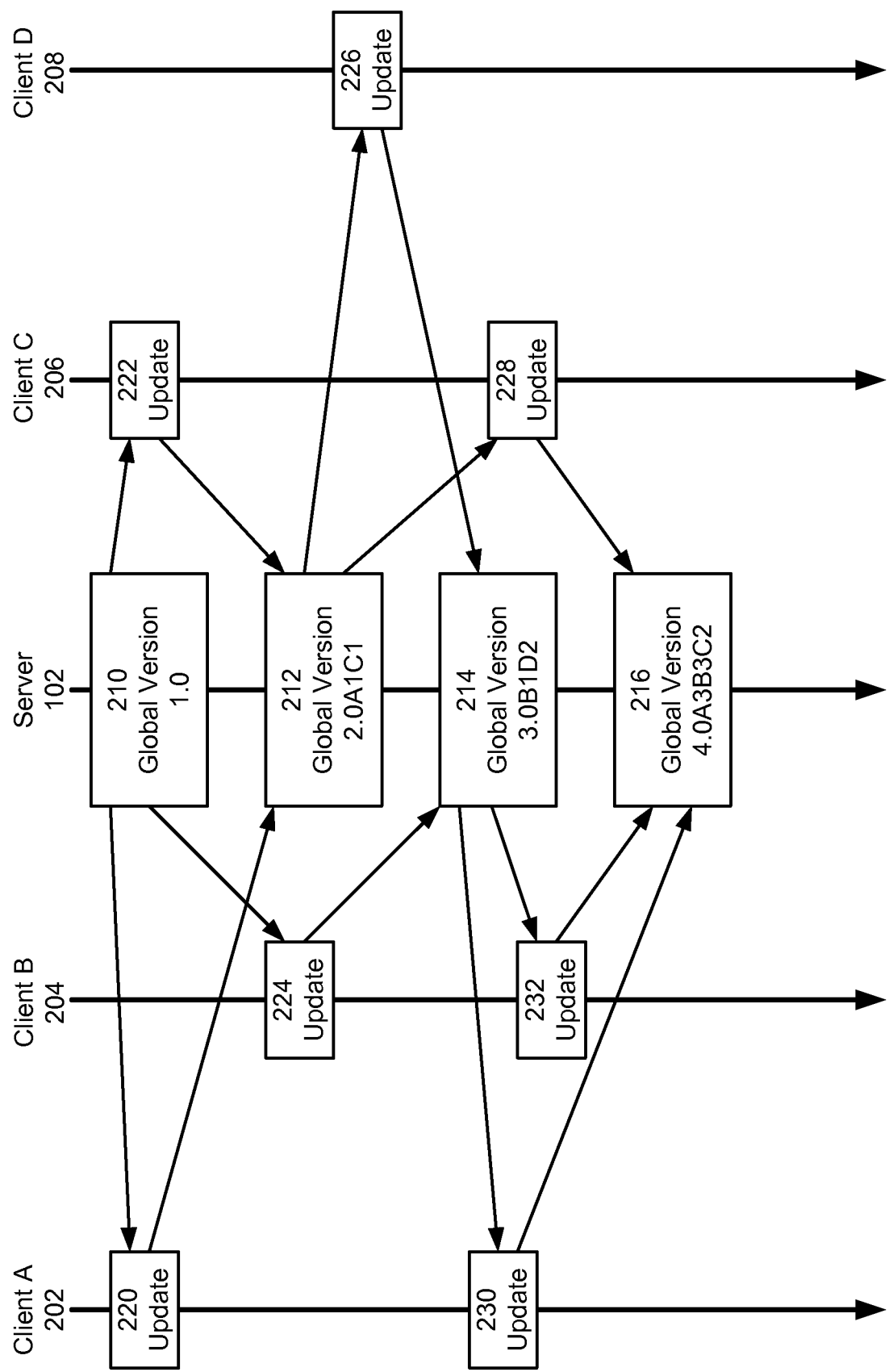
FIG. 2 shows an exemplary sequence of operations involved in performing asynchronous distributed machine learning in accordance with the disclosed embodiments.

FIG. 2 shows an exemplary sequence of operations involved in performing asynchronous distributed machine learning in accordance with the disclosed embodiments. As mentioned above, server 102 may use version control to produce global versions 210-216 of a statistical model (e.g., statistical model 108 of FIG. 1) that are created and transmitted to a set of clients A 202, B 204, C 206, and D 208 independently of updates 220-234 to global versions 210-216 from the clients.

In particular, server 102 may begin with a first global version 210 of the statistical model and assign it a version identifier of "1.0". Server 102 may transmit global version 210 to clients A 202, B 204, and C 206. In turn, client A 202 may generate an update 220 to global version 210, and client C 206 may generate a separate update 222 to global version 210. Updates 220 and 222 may be transmitted to server 102 and merged into a second global version 212 with a version identifier of "2.0A1C1." To generate the version identifier of global version 212, server 102 may increment the version number (e.g., "2.0") of the statistical model, identify updates 220 and 222 as changes to global version 210 from clients A 202 and C 206, and append representations of the updates and the global version modified by the updates (e.g., "A1" and "C1") to the version number.

Once global version 212 is created, server 102 may transmit global version 212 to clients C 206 and D 208, and client D 208 may generate an update 226 to global version 212. Server 102 may also receive an update 224 to global version 210 from client B 204 after global version 212 is produced. As a result, server 102 may merge updates 224 and 226 to two separate global versions 210, 212 of the statistical model into a third global version 214 with a version identifier of "3.0B1D2." As with the version identifier of global version 212, server 102 may generate the version identifier for global version 214 by incrementing the version number (e.g., "3.0") of the statistical model, identifying updates 224 and 226 as respective changes to global versions 210 and 212 from clients B 204 and D 208, and append representations of the updates and the global versions modified by the updates (e.g., "B1" and "D2") to the version number.

Server 102 may then transmit global version 214 to clients A 202 and B 204. In turn, clients A 202 and B 204 may produce two separate updates 230 and 232 to global version 214. After global version 214 is produced, client C 206 may transmit an update 228 to global version 212 to server 102. Finally, server 102 may merge updates 228-232 into a fourth global version 216 with a version identifier of "4.0A3B3C2." The version identifier may include a higher version number (e.g., "4.0") than previous global versions 210-214, followed by representations of updates 228-232 and version numbers of global versions 212-214 modified by the updates (e.g., "A3," "B3," and "C2").

By tracking the merging of updates 220-232 into global versions 210-216 using version identifiers of global versions 210-216, server 102 may generate new global versions of the statistical model independently from receiving updates 220-232 to previous global versions from clients A 202, B 204, C 206, and D 208. For example, server 102 may use the version identifiers to ensure that updates that were previously merged into previous global versions are not merged into a new global version of statistical model 108, and that updates that have been received from the clients but not merged into the previous global versions are included in the new global version. In other words, server 102 may use bidirectional model transmission with the clients and a version-control technique to perform asynchronous distributed machine learning.

Figure 3:
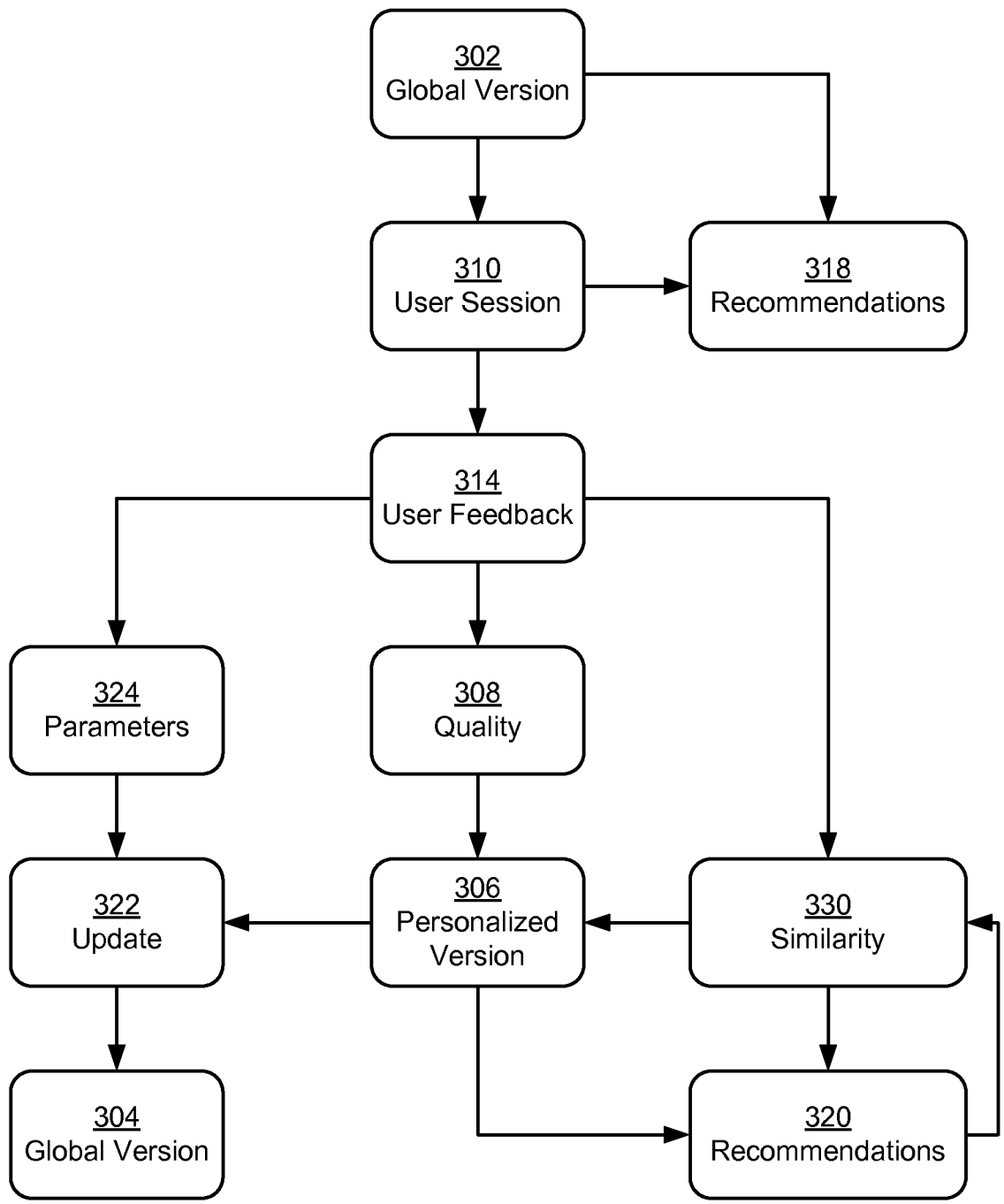
FIG. 3 shows the regularization of model adaptation for in-session recommendations in accordance with the disclosed embodiments.

FIG. 3 shows the regularization of model adaptation for in-session recommendations in accordance with the disclosed embodiments. More specifically, FIG. 3 shows the personalization of a statistical model (e.g., statistical model 108) to a user during a user session 310 with the user on a client (e.g., client 1 104, client y 106 of FIG. 1). First, the client may obtain a global version 302 of the statistical model from a server, such as server 102 of FIG. 1. For example, the client may download global version 302 from the server at the beginning of a first user session 310 with the user.

Next, the client may use the statistical model to interact with the user during user session 310. For example, the client may implement one or more features of a web application, native application, mobile application, and/or other type of application. During interaction with the user in user session 310, the client may use global version 302 to output one or more recommendations 318 to the user. For example, the client may recommend one or more job listings to the user during use of a job search tool with an online professional network.

As shown in FIG. 3, the client may also use user feedback 314 from the user to create a personalized version 306 of the statistical model during user session 310. Continuing with the above example, the client may create personalized version 306 from global version 302 at the beginning of user session 310 and use the session identifier for user session 310 as the update identifier for personalized version 306. Next, the client may track the user's clicks, views, searches, applications to job listings, and/or other activity with the job search tool as user feedback 314 from the user. Each piece of user feedback 314 may be provided as training data that is used to create or update personalized version 306 during user session 310. For example, personalized version 306 may be updated with each click and/or other type of input received from the user. In turn, the output of personalized version 306 may be adapted to the user's real-time behavior or preferences during user session 310.

In one or more embodiments, training of personalized version 306 is affected by the quality 308 of user feedback 314. Quality 308 may be based on the context of and/or one or more attributes associated with user feedback 314. For example, information submitted in one or more form fields may represent higher quality user feedback 314 since significant effort and/or time may be required to enter the information in the form field(s). Conversely, a series of rapid clicks without additional input from the user may represent lower quality user feedback 314 because less time or effort is spent on generating the clicks and/or viewing content associated with the clicks, and thus the clicks are less likely to indicate user intent than user feedback 314 that requires more user interaction.

To train personalized version 306 based on quality 308 of user feedback 314, each piece of user feedback 314 may be assigned a weight that reflects quality 308. For example, higher quality user feedback 314 may be weighted more than lower quality user feedback 314 so that personalized version 306 is adapted more to the higher quality user feedback 314 than the lower quality user feedback 314. After each piece of user feedback 314 is assigned a weight, the weight may be provided as additional training data to personalized version 306. Alternatively, the weight may be used to scale a value representing the corresponding user feedback 314 before the value is inputted as training data to personalized version 306.

Similarly, user feedback 314 may be labeled before user feedback 314 is provided as training data to personalized version 306. For example, user feedback 314 may be labeled as positive or negative feedback, with positive feedback representing positive user actions (e.g., clicks, views, searches, conversions, likes, shares, upvotes, follows, etc.) and negative feedback representing a lack of user action (e.g., non-clicks or ignores) or negative user actions (e.g., downvotes, dislikes, hides, unfollows, etc.). The labels may also include weights associated with quality 308. For example, strong positive labels for user feedback 314 may be associated with longer viewing times and/or lengthier user interaction, while weak positive labels for user feedback 314 may be associated with short viewing times and/or an immediate return to a previous screen of the application.

Once personalized version 306 is adapted from global version 302 based on user feedback 314 during user session 310, personalized version 306 may be used to output one or more additional recommendations 320 to the user. More specifically, recommendations 320 from personalized version 306 may be based on both user feedback 314 and previously outputted recommendations 318. First, recommendations 320 may be selected based on a similarity 330 to content associated with user feedback 314. For example, recommendations 320 may include job postings with high similarity 330 (e.g., similar job titles, industries, job descriptions, etc.) to other job postings with which the user has previously interacted during user session 310. At the same time, because personalized version 306 is adapted from global version 302 instead of created only from relatively small amounts of user feedback 314 in user session 310, overfitting of personalized version 306 to user feedback 314 may be averted.

Second, recommendations 318 and user feedback 314 may be used by personalized version 306 to avoid including previously outputted recommendations 318 in newer recommendations 320. For example, personalized version 306 may track previously outputted recommendations 318, 320 and user feedback 314 associated with the recommendations. Each time a recommendation is selected and shown to the user without receiving positive user feedback 314 (e.g., a click) associated with the recommendation, the importance of the recommendation is discounted. If the user continues to ignore the recommendation, the frequency with which the recommendation is selected and/or shown may continue to decrease until the recommendation is no longer outputted to the user. Instead, personalized version 306 may be used to output new recommendations, which may be more relevant and/or interesting to the user. In other words, personalized version 306 may be used to perform impression discounting of recommendations 318, 320 during user session 310.

At the end of user session 310, the client may transmit an update 322 containing a difference between personalized version 306 and global version 302 to the server. Once update 322 is provided to the server, the client may discard personalized version 306. In turn, the server may use update 322 and/or other updates to global version 302 or other previous global versions of the statistical model from other clients to produce a new global version 304 of the statistical model. For example, the server may use version control to merge update 322 and/or the other updates into global version 304 asynchronously from receiving the updates from the clients, as discussed above. The server may then transmit global version 304 to the clients, and the clients may adapt global version 304 into personalized versions during individual user sessions with a set of users. As a result, the statistical model may be continuously updated through the creation of per-session personalized versions of the statistical model from global versions of the statistical model on the clients and the subsequent merging of the personalized versions into new global versions of the statistical model on the server.

In one or more embodiments, personalized version 306 and update 322 are created based on one or more parameters 324 associated with regularized in-session adaptation of the statistical model. As described above, parameters 324 may include an optimization parameter and/or a regularization parameter. The optimization parameter may be used by the server to adjust the rate of convergence of global versions 302, 304 of the statistical model.

The regularization parameter may be used by the client to control the amount of personalization of the statistical model to the user during user session 310. As discussed above, the regularization parameter may be represented by $\gamma$ in the above equations for performing asynchronous ADMM. When $\gamma$ is 0, personalized version 306 is fully adapted to the user's in-session behavior and is completely separate from any global versions of the statistical model. As $\gamma$ increases, personalized version 306 is affected more by global version 302.

The regularization parameter may be adapted to user feedback 314 and/or other user behavior or characteristics. For example, the regularization parameter may initially be set to a large value to prevent overfitting of the statistical model to limited user feedback 314 during user session 310. As additional user feedback 314 is collected, the regularization parameter may be decreased to adapt personalized version 306 to the behavior of the user. If the behavior of the user diverges from that of other users (e.g., based on aggregated user feedback from the other users used to create global version 302), the regularization parameter may continue to be decreased until the regularization parameter reaches 0. In another example, different values of the regularization parameter may be used with different user sessions with the user, and the value of the regularization parameter with the best performance may be selected for the user.

Figure 4:
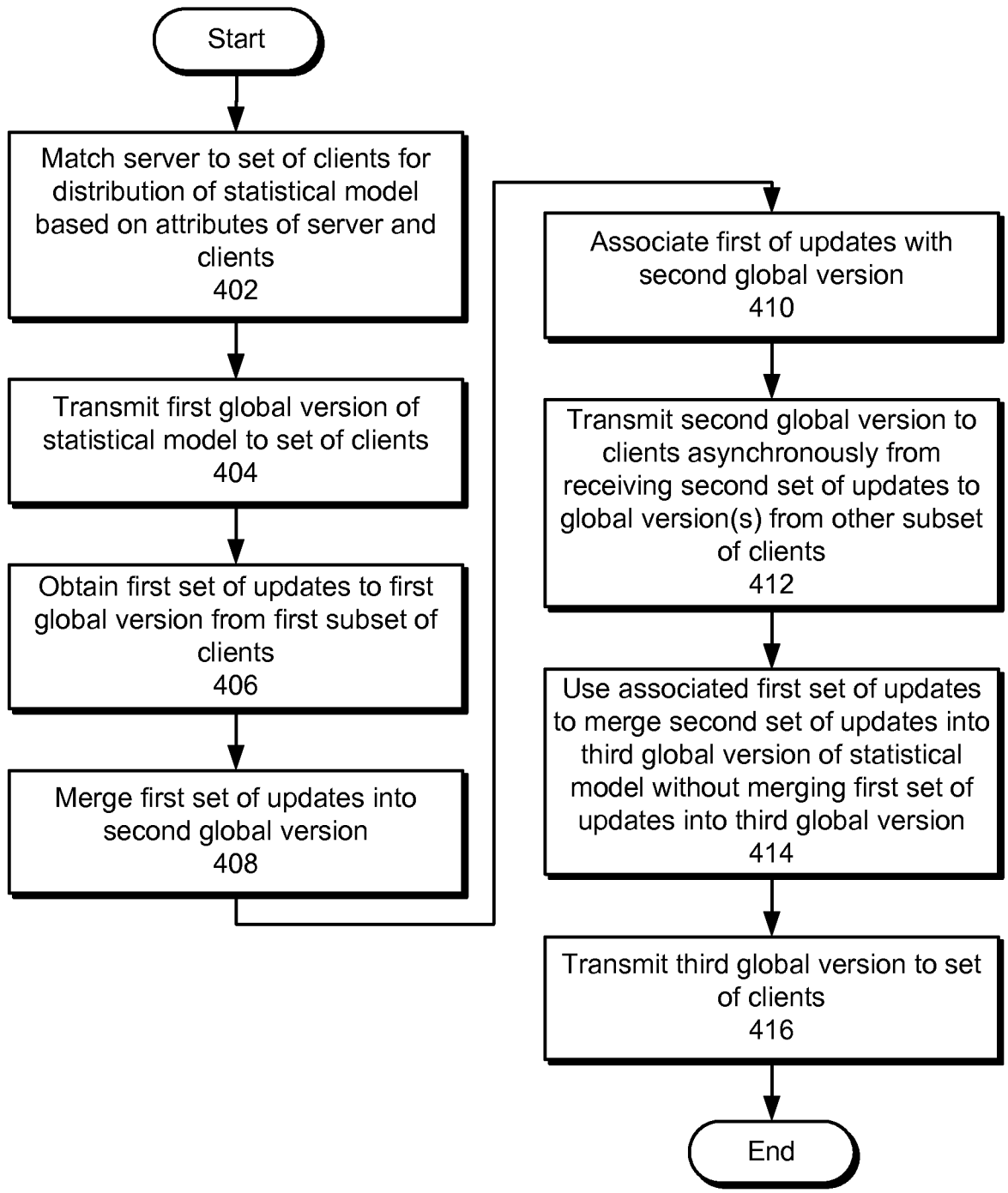
FIG. 4 shows a flowchart illustrating the process of operating a server in an asynchronous distributed machine learning system in accordance with the disclosed embodiments.

FIG. 4 shows a flowchart illustrating the process of operating a server in an asynchronous distributed machine learning system in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, the server is matched to a set of clients for distribution of a statistical model based on attributes of the server and clients (operation 402). For example, the speed, amount of memory, and/or network bandwidth of the server may be matched to the network traffic, popularity, and/or cost associated with the clients. Next, the server transmits a first global version of the statistical model to the set of clients (operation 404). For example, the server may merge a number of local versions of the statistical model from the clients into the first global version of the statistical model. Alternatively, the server and/or another component may generate the global version from a predefined set of training data. The server may then broadcast the first global version to the clients for updating of the first global version on the clients.

After the first global version is provided to the clients, the server obtains a first set of updates to the first global version from a first subset of clients (operation 406). Each update may include a difference between a local version of the statistical model on the corresponding client and the first global version. For example, the client may produce the update by training the first global version using data (e.g., user feedback) on the client.

Next, the server merges the first set of updates into a second global version of the statistical model (operation 408). For example, the server may generate the second global version as an average of the first set of updates, as previously described with respect to the asynchronous ADMM technique. Alternatively, the server may use a set of weights associated with the first subset of clients to merge the first set of updates into the second global version, so that some updates contribute more to the second global version than other updates. Each weight may represent a recency, a level of activity, a popularity, a revenue, and/or another attribute associated with the corresponding update.

Similarly, the server associates the first set of updates with the second global version (operation 410). For example, the server may obtain and/or generate update identifiers for the first set of updates and/or the global versions used to produce the updates, and combine the update identifiers into a version identifier for the second global version. In other words, the server may use version control to track and manage the asynchronous merging of updates from the clients into global versions of the statistical model.

The server may then transmit the second global version to the clients asynchronously from receiving a second set of updates to one or both global versions from another subset of the clients (operation 412). For example, the server may generate and broadcast the second global version without using any iteration barriers or locks to synchronize the updates from the clients. To reduce network traffic to and/or from the clients, the server may also transmit a portion of the second global version (e.g., the difference between the second global version and the local version on each client) in lieu of the entire second global version.

The server may then use the associated first set of updates to merge the second set of updates into a third global version of the statistical model without merging the first set of updates into the third global version (operation 414). For example, the server may use the version identifier of the second global version to identify the first set of updates as already merged into the second global version. The server may then generate the third global version by merging updates that have been received since the first set of updates into the second global version. Finally, the server may transmit the third global version to the set of clients (operation 416) for subsequent updating of the third global version on the clients, as described below with respect to FIG. 5. As with the second global version, the server may transmit one or more portions of the third global version ti the clients in lieu of the entire third global version to reduce network traffic to the clients.

Figure 5:
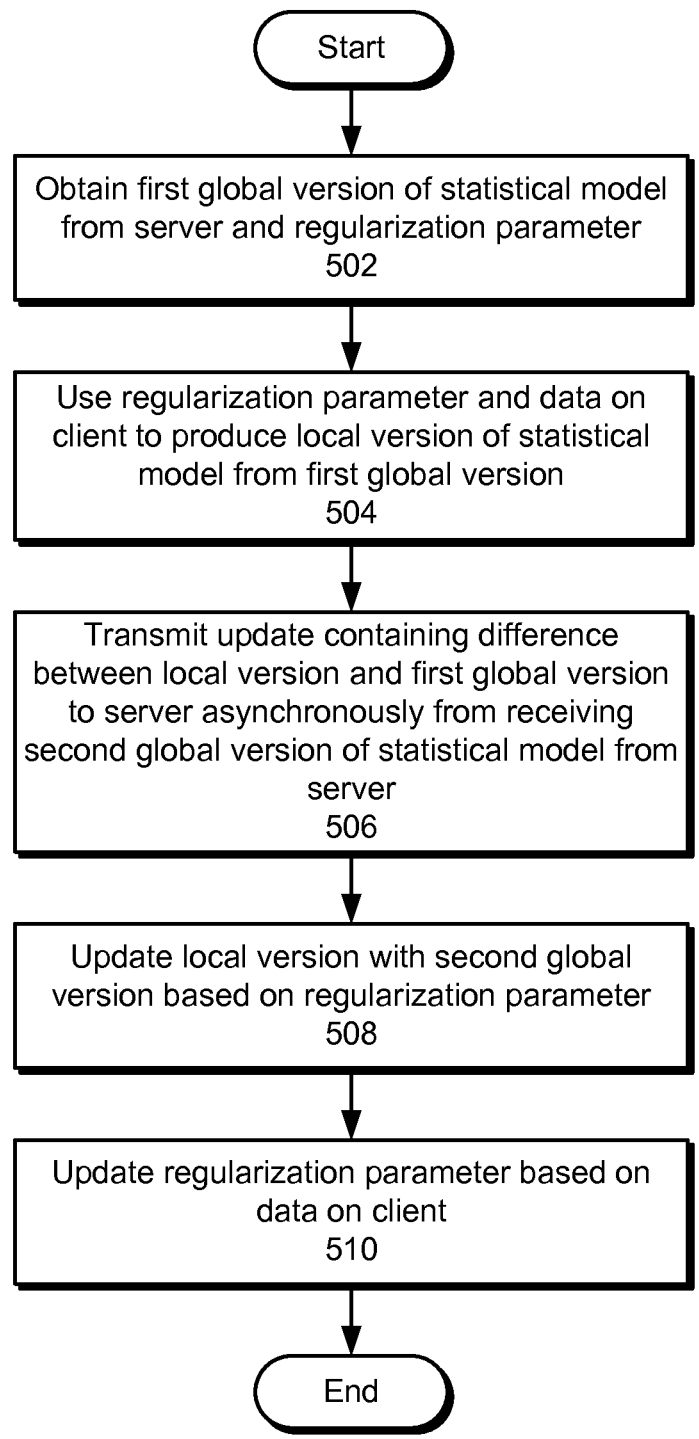
FIG. 5 shows a flowchart illustrating the process of operating a client in an asynchronous distributed machine learning system in accordance with the disclosed embodiments.

FIG. 5 shows a flowchart illustrating the process of operating a client in an asynchronous distributed machine learning system in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

The client initially obtains a first global version of a statistical model from the server, as well as a regularization parameter (operation 502) for the statistical model. The regularization parameter may control the level of personalization of the statistical model on the client. Next, the client uses the regularization parameter and data on the client to produce a local version of the statistical model from the first global version (operation 504). For example, the client may output one or more recommendations from the first global version and obtain user feedback associated with the recommendation(s) from a user on the client. The client may produce the local version from the first global version by providing the user feedback as training data to the first global version and using the regularization parameter to adjust the amount by which the local version is affected by the training data. The client may then update the local version based on additional user feedback and use the local version to generate additional recommendations during a user session with the user. In other words, the client may use the local version to customize the output of the statistical model to the user's preferences and/or behavior.

The client then transmits an update containing a difference between the local version and the first global version to the server asynchronously from receiving a second global version of the statistical model from the server (operation 506). For example, the client may calculate the update based on the equations discussed above with respect to the asynchronous ADMM technique. The client may then transmit the update at the end of a user session with a user, on a periodic basis, and/or according to other criteria associated with updating the statistical model.

The client may also update the local version with the second global version based on the regularization parameter (operation 508). For example, the client may use the regularization parameter to combine the local version and the second global version during a subsequent user session or other interval during which the statistical model is updated on the client. Alternatively, the client may replace the local version with the second global version at the beginning of the subsequent user session or model-training session if the local version is persisted only for the duration of a single session.

The client may additionally update the regularization parameter based on data on the client (operation 510). For example, the client may track user feedback that is used to update the statistical model during one or more user sessions with the user. If the user feedback deviates from expected user behavior as captured by global versions of the statistical model, the regularization parameter may be updated to increase the personalization of the local version to the user's behavior. Alternatively, the regularization parameter may be modified to reduce the personalization of the local version if the user's behavior is similar to user behavior used to produce the global versions.

Figure 6:
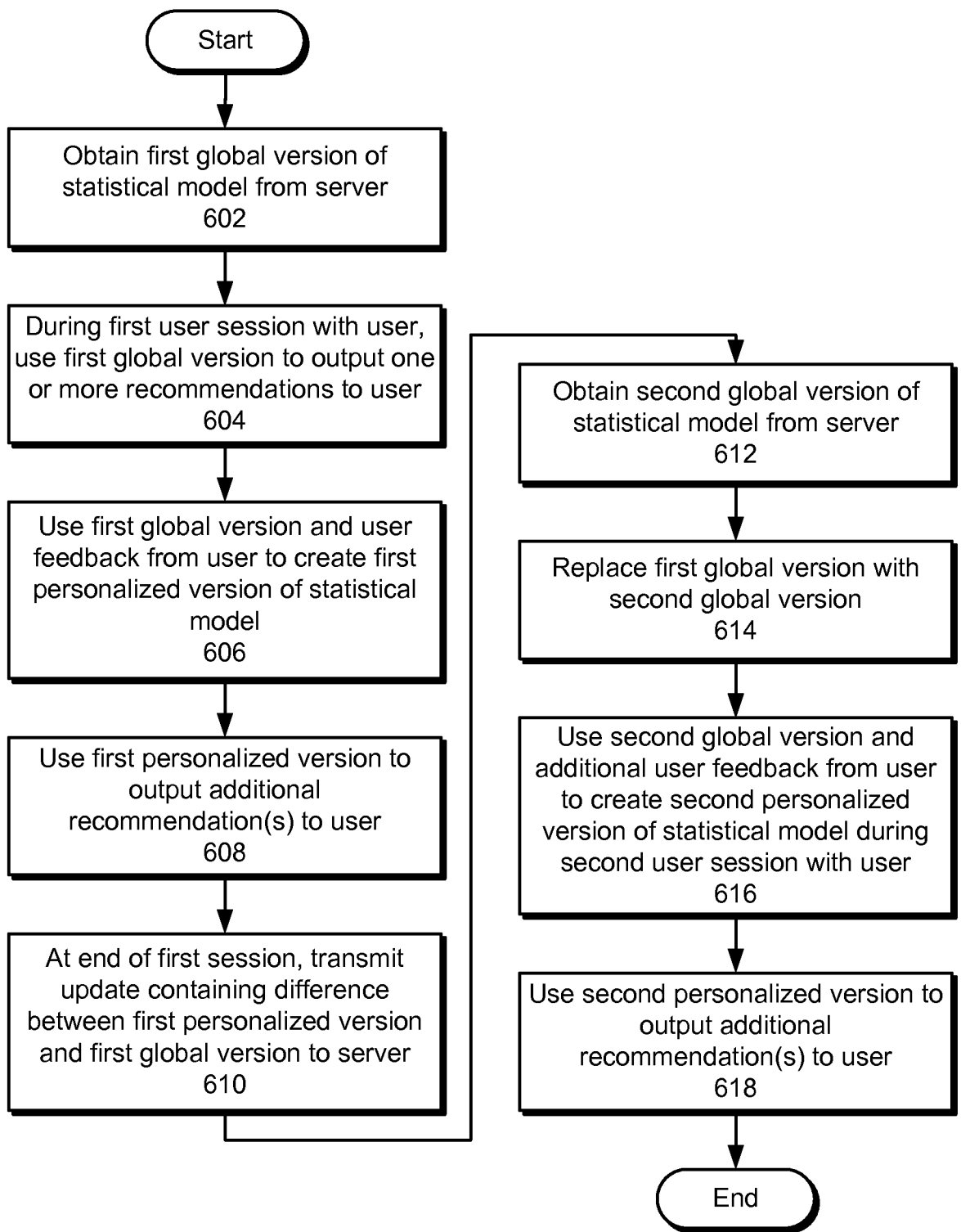
FIG. 6 shows a flowchart illustrating the process of performing regularized model adaptation for in-session recommendations in accordance with the disclosed embodiments.

FIG. 6 shows a flowchart illustrating the process of performing regularized model adaptation for in-session recommendations in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, a first global version of a statistical model is obtained from a server (operation 602). The first global version may be obtained by a client for performing the in-session recommendations. During a first user session with a user, the client uses the first global version to output one or more recommendations to the user (operation 604). For example, the client may use the first global version to recommend one or more job listings to the user while the user interacts with a job search tool on the client.

Next, the client uses the first global version and user feedback from the user to create a first personalized version of the statistical model (operation 606). For example, the client may generate the first personalized version from the first global version by providing the first piece of user feedback as training data for the first global version. Once the personalized version is created from the first global version, the client may update the first personalized version in real-time with each unit of user feedback received from the user. During creation of the first personalized version, the client may determine one or more weights for the user feedback based on the quality of the user feedback. The client may then include the weight(s) and the user feedback in training data for creating the first personalized version from the global version. In turn, the weight(s) may allow the first personalized version to be adapted more to higher quality user feedback and less to lower quality user feedback.

The client then uses the first personalized version to output one or more additional recommendations to the user (operation 608). For example, the client may use the first personalized version to discount the selection of previously outputted recommendations that were ignored by the user. In another example, the client may select additional recommendation(s) that are similar to content associated with the user feedback. As a result, the client may adapt the statistical model to the in-session behavior of the user.

At the end of the first session, the client transmits an update containing a difference between the first personalized version and the first global version to the server (operation 610). The update may then be used by the server to produce a second global version of the statistical model, as discussed above.

After the second global version is produced and the first user session has concluded, the client obtains the second global version from the server (operation 612) and replaces the first global version with the second global version (operation 614). The client then uses the second global version and additional user feedback from the user to create a second personalized version of the statistical model during a second user session with the user (operation 616). Finally, the client uses the second personalized version to output one or more additional recommendations to the user (operation 618).

In other words, the client may create a separate personalized version of the statistical model from the latest global version during each user session with the user. At the end of the user session, the client may transmit an update representing the difference between the personalized version and the global version from which the personalized version was created to the server for use in producing a subsequent global version of the statistical model by the server. Per-session user feedback at the client may thus be used to adapt the statistical model to the user's behavior and generate subsequent global versions of the statistical model.

Figure 7:
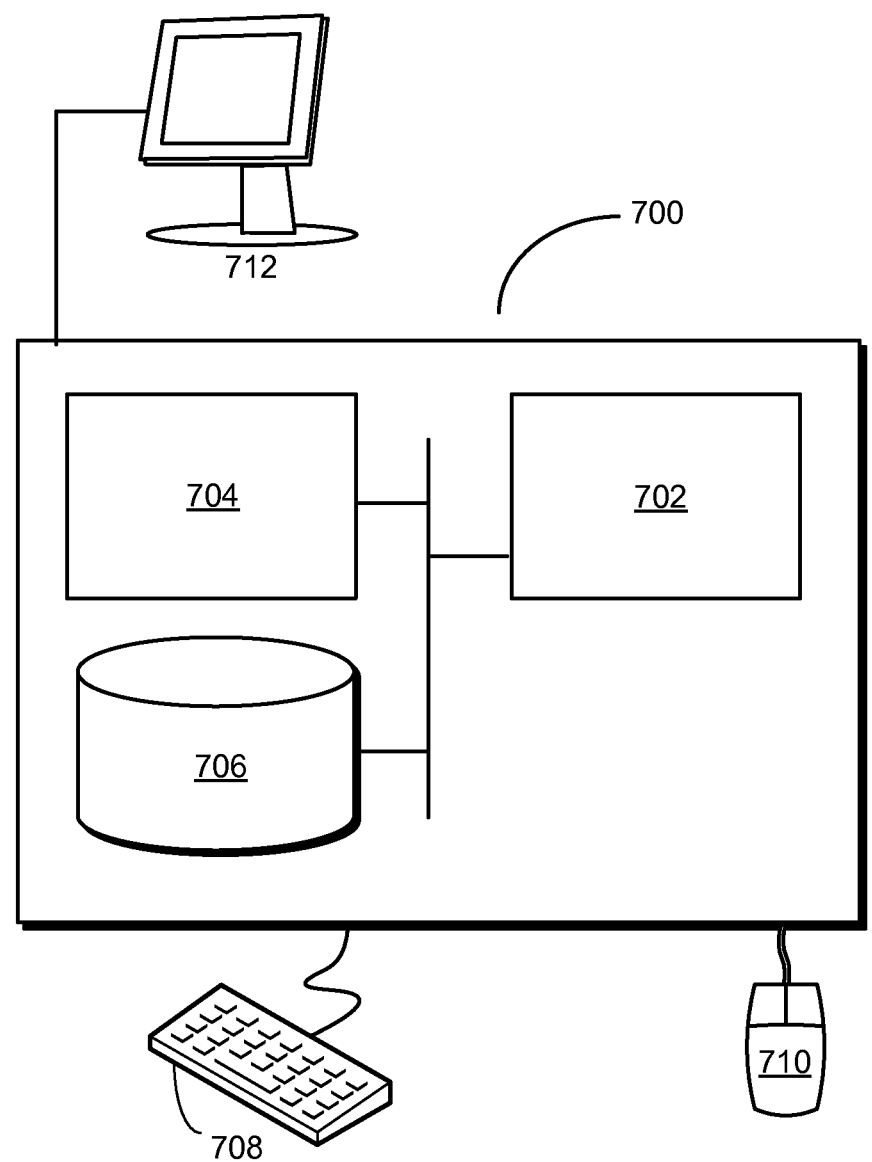
FIG. 7 shows a computer system in accordance with the disclosed embodiments.

FIG. 7 shows a computer system 700 in accordance with an embodiment. Computer system 700 may correspond to an apparatus that includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for performing version control for asynchronous distributed machine learning. The system may include a server that transmits a first global version of a statistical model to a set of client computer systems. Next, the server may obtain, from a first subset of the client computer systems, a first set of updates to the first global version. The server may then merge the first set of updates into a second global version of the statistical model. Finally, the server may transmit the second global version to the client computer systems asynchronously from receiving a second set of updates to the first and second global versions from a second subset of the client computer systems.

Alternatively, computer system 700 may implement one of the clients. The client may obtain the first global version from the server. Next, the client may update the first global version with data on the computer system to produce a local version of the statistical model. The client may then transmit an update containing a difference between the local version and the first global version to the server asynchronously from receiving a second global version of the statistical model from the server.

The client may additionally perform regularized model adaptation for in-session recommendations. More specifically, the client may improve a performance of the statistical model during a user session with a user. First, the client may use the first global version to output one or more recommendations to the user. Next, the client may use the first global version and user feedback from the user to create a first personalized version of the statistical model. At the end of the first session, the client may transmit the update containing the difference between the first personalized version and the first global version to the server for use in updating the first global version by the server.

In addition, one or more components of computer system 700 may be remotely located and connected to the other components over a network. Portions of the present embodiments (e.g., server, clients, local versions, global versions, personalized versions, etc.) may also be located on different nodes of a distributed system that implements the embodiments. For example, the present embodiments may be implemented using a cloud computing system that performs asynchronous distributed machine learning and/or in-session personalization based on updates to a statistical model from a set of remote clients.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    obtaining, from a server by a first computer system of a first user within a group of users, a first global version of a statistical model produced for the group of users, wherein the first global version of the statistical model is produced based on a set of predefined training data; and
    during a first user session with the first user, improving a performance of the statistical model by performing the following steps on the first computer system of the first user:
        receiving one or more recommendations to the first user generated by the first global version;
        collecting user feedback from the first user interacting with the one or more recommendations; and
        creating a first personalized version of the statistical model for the first user by updating the first global version using the user feedback as training data; and
    at an end of the first user session, transmitting an update comprising a difference between the first personalized version and the first global version from the first computer system to the server;
    wherein the update is used by the server to produce a second global version of the statistical model;
    wherein the second global version of the statistical model is used by the server to make recommendations for the group of users; and
    wherein transmitting the difference between the first personalized version and the first global version from the first computer system to the server as an update from the first user reduces network traffic between the server and the first computer system.

2. The method of claim 1, further comprising:
obtaining the second global version of the statistical model from the server, wherein the second global version comprises the update and one or more additional updates to the statistical model from one or more additional computer systems;
replacing the first global version with the second global version; and
using the second global version and additional user feedback from the first user to create a second personalized version of the statistical model during a second user session with the first user.

3. The method of claim 1, further comprising:
using the first personalized version to output one or more additional recommendations to the first user.

4. The method of claim 3, wherein using the first personalized version to output the one or more additional recommendations to the first user comprises:
selecting the one or more additional recommendations based on the one or more recommendations and the user feedback.

5. The method of claim 4, wherein selecting the one or more additional recommendations based on the one or more recommendations and the user feedback comprises:
selecting the one or more additional recommendations based on a similarity to content associated with the user feedback.

6. The method of claim 4, wherein selecting the one or more additional recommendations based on the one or more recommendations and the user feedback comprises:
using the one or more recommendations and the user feedback to avoid selecting a recommendation that was previously outputted during the first user session.

7. The method of claim 1, wherein using the first global version and user feedback from the first user to create the first personalized version of the statistical model comprises:
determining one or more weights for the user feedback based on a quality of the user feedback; and
including the one or more weights and the user feedback in training data for creating the first personalized version from the first global version.

8. The method of claim 1, wherein using the first global version and the user feedback from the first user to create the first personalized version of the statistical model comprises:
updating the first personalized version after one or more units of the user feedback are received from the first user.

9. The method of claim 1, wherein the one or more recommendations comprise at least one of:
a job recommendation;
a news recommendation;
a user-interface element; and
an action.

10. The method of claim 1, wherein the user feedback comprises at least one of:
a click;
a view;
a conversion; and
a search.

11. A method, comprising:
transmitting, from a server to a set of computer systems, a first global version of a statistical model for generating a set of recommendations for a set of users, wherein the first global version of the statistical model is produced based on a set of predefined training data;
during user sessions, collecting user feedback from a first subset of the set of users interacting with the set of recommendations generated by the first global version;
creating a first set of personalized versions of the statistical model for the first subset of users by updating the first global version for each of the first subset of users using corresponding collected user feedback as training data;
transmitting to the server, from a first subset of the set of computer systems associated with the first subset of users, a first set of updates comprising differences between the first global version of the statistical model and each of the first set of personalized versions of the statistical model;
receiving, by the server, the first set of updates;
merging, by the server, the first set of updates with the first global version of the statistical model to produce a second global version of the statistical model for the set of users; and
transmitting at least a portion of the second global version to the set of computer systems for generating recommendations for the set of users asynchronously from receiving a second set of updates to the first and second global versions from a second subset of the computer systems, wherein transmitting at least a portion of the second global version from the server to the set of computer systems asynchronously from receiving the second set of updates from the set of computer systems allows for faster updates of the second global version of the statistical model than a synchronous model update process that uses barriers or locks to synchronize receiving model updates and transmitting the second global version.

12. The method of claim 11, further comprising:
associating the first set of updates with the second global version;
using the associated first set of updates to merge the second set of updates into a third global version of the statistical model without merging the first set of differences into the third global version; and
transmitting at least a portion of the third global version to the set of computer systems.

13. The method of claim 12, wherein associating the first set of updates with the second global version comprises:
combining the first set of update identifiers into a version identifier for the second global version.

14. The method of claim 13, wherein using the associated first set of updates to merge the second set of updates into the third global version without merging the first set of differences into the third global version comprises:
identifying the first set of update identifiers in the version identifier for the second global version; and
omitting merging of the first set of updates into the second global version based on the identified first set of update identifiers in the version identifier.

15. The method of claim 11, further comprising:
matching the server to the set of client computer systems for distribution of the statistical model based on a first attribute of the server and a second attribute of the set of client computer systems.

16. A computer system, comprising:
one or more processors; and
memory storing instructions that, when executed by the one or more processors, cause the computer system to:
obtain, from a server, a first global version of a statistical model produced for a group of users, wherein the first global version of the statistical model is produced based on a set of predefined training data; and during a first user session with a first user within the group of users, improve a performance of the statistical model by:
    using the first global version to output one or more recommendations to the first user;
    receiving one or more recommendations to the first user generated by the first global version;
    collecting user feedback from the first user interacting with the one or more recommendations;
    creating a first personalized version of the statistical model for the first user by updating the first global version using the user feedback as training data; and
    at an end of the first user session, transmitting an update comprising a difference between the first personalized version and the first global version to the server;

wherein the update is used by the server to produce a second global version of the statistical model;

wherein the second global version of the statistical model is used by the server to make recommendations for the group of users; and wherein transmitting the difference between the first personalized version and the first global version from the computer system to the server as an update from the first user reduces network traffic between the server and the computer system.

17. The computer system of claim 16, wherein the memory further stores instructions that, when executed by the one or more processors, cause the computer system to:
    obtain the second global version of the statistical model from the server, wherein the second global version comprises the update and one or more additional updates to the statistical model from one or more additional computer systems;
    replace the first global version with the second global version; and
    use the second global version and additional user feedback from the first user to create a second personalized version of the statistical model during a second user session with the first user.

18. The computer system of claim 16, wherein the memory further stores instructions that, when executed by the one or more processors, cause the computer system to:
    use the first personalized version to output one or more additional recommendations to the first user.

19. The computer system of claim 16, wherein using the first global version and user feedback from the first user to create the first personalized version of the statistical model comprises:
    determining one or more weights for the user feedback based on a quality of the user feedback; and
    including the one or more weights and the user feedback in training data for creating the first personalized version from the first global version.

20. The computer system of claim 16, wherein using the first global version and the user feedback from the first user to create the first personalized version of the statistical model comprises:
    updating the first personalized version after each unit of the user feedback is received from the first user.

* * * * *